US008223954B2

(12) United States Patent
Dallessandro et al.

(10) Patent No.: US 8,223,954 B2
(45) Date of Patent: Jul. 17, 2012

(54) SYSTEM AND METHOD FOR AUTOMATING CUSTOMER RELATIONS IN A COMMUNICATIONS ENVIRONMENT

(75) Inventors: Lona N. Dallessandro, Austin, TX (US); Kirk Mahoney, Houston, TX (US); James Austin Britt, Austin, TX (US); James Douglas Bruun, San Ramon, CA (US); Rosalinda Garcia, Lubbock, TX (US); Jonathan Paden, Austin, TX (US); Ellen Pate, Dripping Springs, TX (US); Kristina Robinson, Austin, TX (US); Tom Wiatt, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1506 days.

(21) Appl. No.: 11/086,794

(22) Filed: Mar. 22, 2005
(Under 37 CFR 1.47)

(65) Prior Publication Data
US 2006/0215833 A1    Sep. 28, 2006

(51) Int. Cl.
 *H04M 3/00* (2006.01)
 *H04M 11/00* (2006.01)
(52) U.S. Cl. .............. 379/265.02; 379/100.05
(58) Field of Classification Search ............ 379/265.02–266.01, 32.01, 100.05; 455/426.2; 370/352–356
See application file for complete search history.

(56) References Cited

U.S. PATENT DOCUMENTS

| | | | |
|---|---|---|---|
| 4,953,204 A | 8/1990 | Cuschelg, Jr. et al. |
| 4,967,405 A | 10/1990 | Upp et al. |
| 4,975,841 A | 12/1990 | Kehnemuyi et al. |
| 5,297,183 A | 3/1994 | Bareis et al. |
| 5,299,260 A | 3/1994 | Shaio |
| 5,309,513 A | 5/1994 | Rose |
| 5,335,269 A | 8/1994 | Steinlicht |
| 5,432,845 A | 7/1995 | Burd et al. |
| 5,455,903 A | 10/1995 | Jolissaint et al. |
| 5,497,373 A | 3/1996 | Hulen et al. |
| 5,522,046 A | 5/1996 | McMillen et al. |

(Continued)

FOREIGN PATENT DOCUMENTS

EP    0 424 015 A2    4/1991

(Continued)

OTHER PUBLICATIONS

Ogino, Tsukasa, et al.; "Technologies for Internet Infrastructure: Eliminating the World Wide Wait"; iNet Japan; Jul. 18-21, 2000; www.isoc.org/inet2000/cdproceedings/lg/index.htm.

(Continued)

*Primary Examiner* — Davetta W Goins
*Assistant Examiner* — Mohammad Islam
(74) *Attorney, Agent, or Firm* — Toler Law Group, PC

(57) ABSTRACT

A system and method are disclosed for automating network performance to a customer support department that includes a passive listening device configured to monitor portions of a communication network. A performance database may be coupled to the passive listening device and configured to store network performance data. A customer relations module may be included and configured to receive a subscriber inquiry and to identify at least one monitored component of a communication network that affects the subscriber. The module may retrieve performance data on one or more components of the communication network to provide customer-specific communication performance data to the subscriber and/or the agent assisting the subscriber.

25 Claims, 2 Drawing Sheets

U.S. PATENT DOCUMENTS

| | | | |
|---|---|---|---|
| 5,530,744 A | 6/1996 | Charalambous et al. | |
| 5,555,299 A | 9/1996 | Maloney et al. | |
| 5,590,186 A | 12/1996 | Liao et al. | |
| 5,621,789 A | 4/1997 | McCalmont et al. | |
| 5,652,789 A | 7/1997 | Miner | |
| 5,732,133 A | 3/1998 | Mark | |
| 5,754,639 A | 5/1998 | Flockhart et al. | |
| 5,754,978 A | 5/1998 | Perez-Mendez et al. | |
| 5,794,001 A | 8/1998 | Malone et al. | |
| 5,845,062 A * | 12/1998 | Branton et al. | 714/25 |
| 5,867,817 A | 2/1999 | Catallo et al. | |
| 5,923,745 A | 7/1999 | Hurd | |
| 5,937,051 A | 8/1999 | Hurd et al. | |
| 5,940,476 A | 8/1999 | Morganstein | |
| 5,946,388 A | 8/1999 | Walker et al. | |
| 5,953,704 A | 9/1999 | McIlroy et al. | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,016,336 A * | 1/2000 | Hanson | 379/88.23 |
| 6,038,293 A | 3/2000 | McNerney et al. | |
| 6,049,594 A | 4/2000 | Furman et al. | |
| 6,061,433 A * | 5/2000 | Polcyn et al. | 379/93.12 |
| 6,118,866 A | 9/2000 | Shtivelman | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,181,776 B1 * | 1/2001 | Crossley et al. | 379/32.01 |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,320,951 B1 | 11/2001 | Shtivelman et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 | 6/2002 | Bohacek et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,496,567 B1 | 12/2002 | Bjornberg et al. | |
| 6,496,836 B1 | 12/2002 | Ronchi et al. | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,112 B2 | 4/2003 | Ishikawa | |
| 6,553,113 B1 | 4/2003 | Dhir et al. | |
| 6,570,967 B2 | 5/2003 | Katz | |
| 6,574,599 B1 | 6/2003 | Lim et al. | |
| 6,577,718 B1 | 6/2003 | Kalmanek et al. | |
| 6,584,180 B2 | 6/2003 | Nemoto | |
| 6,584,191 B1 | 6/2003 | McPartlan et al. | |
| 6,587,556 B1 | 7/2003 | Judkins et al. | |
| 6,587,558 B2 * | 7/2003 | Lo | 379/265.09 |
| 6,594,470 B1 * | 7/2003 | Barnes et al. | 455/67.7 |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,458 B1 | 2/2004 | Kunjibettu | |
| 6,697,460 B2 | 2/2004 | Knott et al. | |
| 6,697,806 B1 * | 2/2004 | Cook | 1/1 |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,751,591 B1 | 6/2004 | Gorin et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,847,715 B1 | 1/2005 | Swartz | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,895,532 B2 | 5/2005 | Raynham | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,963,983 B2 | 11/2005 | Munson et al. | |
| 7,006,605 B1 | 2/2006 | Morganstein | |
| 7,031,444 B2 | 4/2006 | Shen et al. | |
| 7,035,388 B2 | 4/2006 | Kurosaki | |
| 7,050,936 B2 * | 5/2006 | Levy et al. | 702/181 |
| 7,065,201 B2 | 6/2006 | Bushey et al. | |
| 7,124,059 B2 * | 10/2006 | Wetzer et al. | 702/184 |
| 7,206,400 B2 | 4/2007 | Dezonno et al. | |
| 7,231,384 B2 | 6/2007 | Wu et al. | |
| 7,242,751 B2 | 7/2007 | Bushey et al. | |
| 7,245,716 B2 | 7/2007 | Brown et al. | |
| 7,346,152 B2 * | 3/2008 | Paden et al. | 379/88.16 |
| 7,379,886 B1 | 5/2008 | Zaring et al. | |
| 7,430,554 B1 | 9/2008 | Heisinger | |
| 7,506,241 B2 | 3/2009 | Chefalas et al. | |
| 7,512,545 B2 | 3/2009 | Knott et al. | |
| 7,660,233 B2 * | 2/2010 | Paden et al. | 370/216 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032075 A1 | 10/2001 | Yamamoto | |
| 2001/0032229 A1 | 10/2001 | Hulls et al. | |
| 2001/0034662 A1 | 10/2001 | Morris | |
| 2002/0046030 A1 | 4/2002 | Harista | |
| 2002/0055975 A1 | 5/2002 | Petrovykh | |
| 2002/0057678 A1 | 5/2002 | Jiang et al. | |
| 2002/0059164 A1 | 5/2002 | Shtivelman | |
| 2002/0059169 A1 | 5/2002 | Quaterman et al. | |
| 2002/0067714 A1 | 6/2002 | Crain et al. | |
| 2002/0087316 A1 | 7/2002 | Lee et al. | |
| 2002/0087385 A1 | 7/2002 | Vincent | |
| 2002/0087558 A1 | 7/2002 | Bailey et al. | |
| 2002/0114432 A1 | 8/2002 | Shaffer et al. | |
| 2002/0122544 A1 | 9/2002 | Williams et al. | |
| 2002/0133394 A1 | 9/2002 | Bushey et al. | |
| 2002/0133413 A1 | 9/2002 | Chang et al. | |
| 2002/0135618 A1 | 9/2002 | Maes | |
| 2002/0156699 A1 | 10/2002 | Gray et al. | |
| 2002/0165732 A1 | 11/2002 | Ezzeddine et al. | |
| 2002/0169606 A1 | 11/2002 | Bantz et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |

| | | |
|---|---|---|
| 2003/0103619 A1 | 6/2003 | Brown et al. |
| 2003/0114105 A1 | 6/2003 | Haller et al. |
| 2003/0118159 A1 | 6/2003 | Shen et al. |
| 2003/0130841 A1 | 7/2003 | Bangalore et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0154184 A1* | 8/2003 | Chee et al. .................. 707/1 |
| 2003/0156133 A1 | 8/2003 | Martin et al. |
| 2003/0165223 A1 | 9/2003 | Timmins et al. |
| 2003/0179876 A1* | 9/2003 | Fox et al. ............. 379/265.02 |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0228007 A1 | 12/2003 | Kurosaki |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0030649 A1 | 2/2004 | Nelson et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0018825 A1 | 1/2005 | Ho |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0060200 A1 | 3/2005 | Kobylevsky et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0152530 A1 | 7/2005 | Pence |
| 2005/0169441 A1 | 8/2005 | Yacoub |
| 2005/0169453 A1 | 8/2005 | Knott et al. |
| 2005/0195961 A1 | 9/2005 | Pasquale et al. |
| 2005/0201547 A1 | 9/2005 | Burg et al. |
| 2005/0240411 A1 | 10/2005 | Yacoub |
| 2005/0254632 A1 | 11/2005 | Pasquale et al. |
| 2005/0278655 A1 | 12/2005 | Sims |
| 2006/0002540 A1 | 1/2006 | Kreiner et al. |
| 2006/0023863 A1 | 2/2006 | Joseph |
| 2006/0039547 A1 | 2/2006 | Klein |
| 2006/0056287 A1* | 3/2006 | Paden et al. .................. 370/225 |
| 2006/0072737 A1 | 4/2006 | Paden et al. |
| 2006/0085538 A1* | 4/2006 | Newman et al. ............... 709/224 |
| 2006/0109974 A1 | 5/2006 | Paden et al. |
| 2006/0109976 A1* | 5/2006 | Sundaram et al. ....... 379/265.02 |
| 2006/0115070 A1* | 6/2006 | Bushey et al. ........... 379/265.02 |
| 2006/0146806 A1 | 7/2006 | Khuc et al. |
| 2006/0165057 A1* | 7/2006 | Paden et al. .................. 370/352 |
| 2006/0177040 A1 | 8/2006 | Mitra |
| 2006/0256956 A1 | 11/2006 | Lee et al. |
| 2006/0291642 A1 | 12/2006 | Bushey et al. |
| 2006/0291644 A1 | 12/2006 | Ellinwood |
| 2007/0025542 A1 | 2/2007 | Bushey et al. |
| 2007/0041551 A1 | 2/2007 | Whitecotten et al. |
| 2007/0047720 A1 | 3/2007 | Brandt et al. |
| 2007/0116230 A1 | 5/2007 | Brandt et al. |
| 2007/0206772 A1 | 9/2007 | Sato et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| EP | 0 876 652 A4 | 11/1998 |
| WO | 97/26612 A1 | 7/1997 |
| WO | WO 97/26612 | 7/1997 |
| WO | 01/37539 A2 | 5/2001 |
| WO | 01/37539 A3 | 5/2001 |
| WO | WO 01/37539 A2 | 5/2001 |
| WO | WO 01/37539 A3 | 5/2001 |
| WO | WO 2004/017584 | 2/2004 |
| WO | 2004/017584 | 4/2004 |
| WO | WO 2004/049222 A2 | 6/2004 |
| WO | 2004/049222 A2 | 10/2004 |

OTHER PUBLICATIONS

U.S. Appl. No. 10/898,722, filed Jul. 23, 2004.
U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 10/975,023, filed Oct. 27, 2004.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

SYSTEM AND METHOD FOR AUTOMATING CUSTOMER RELATIONS IN A COMMUNICATIONS ENVIRONMENT

FIELD OF THE DISCLOSURE

The present disclosure relates generally to automating customer support.

BACKGROUND

In today's competitive communications market, service providers strive to improve system performance. Although near perfect reliability and extraordinary speeds are goals of service providers, often unplanned and unexpected phenomena degrade system performance. When a customer feels that performance of their communications system is less than average, they often call a service center to request information, determine if there is an outage, or see if there is work in process to solve their problem. Often customer equipment fails, yet the customer will blame the service provider and inquire whether the service provider is having problems.

Communication service providers seek to efficiently address these concerned subscribers. However, service providers often lack the available resources to identify problems that are specific to subscribers. In fact, a single subscriber may be provided with physical connections and signal processing from many different providers within a network. The vast network of communication systems not only lacks detection equipment but the ability to communicate detected system problems. Accordingly, there is a need for an improved customer service system.

BRIEF DESCRIPTION OF THE DRAWINGS

It will be appreciated that, for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

A system and method are disclosed for automating network performance reporting. In some cases, the reporting may be provided to a customer and/or to a customer support department. Depending upon implementation detail, a system incorporating the present teachings may include a passive listening device configured to monitor portions of a communication network. A performance database may be coupled directly and/or indirectly to the passive listening device and configured to store network performance data.

A customer relations module may be set up to receive a subscriber inquiry and to identify at least one component of a communication network that affects the subscriber. The module may retrieve relevant performance data on identified components of the communication network to provide customer-specific communication performance data to the subscriber and/or an agent assisting the subscriber. In one configuration, the passive listening device can be configured to monitor at least one performance characteristic of a communications network component and to output a plurality of signals representing the performance characteristic. A customer relations management module may be configured to manage customer connection data, to create a list of components used by a given subscriber, and to identify and provide a status of components that have or continue to affect the service provided to the given subscriber.

Figure 1:
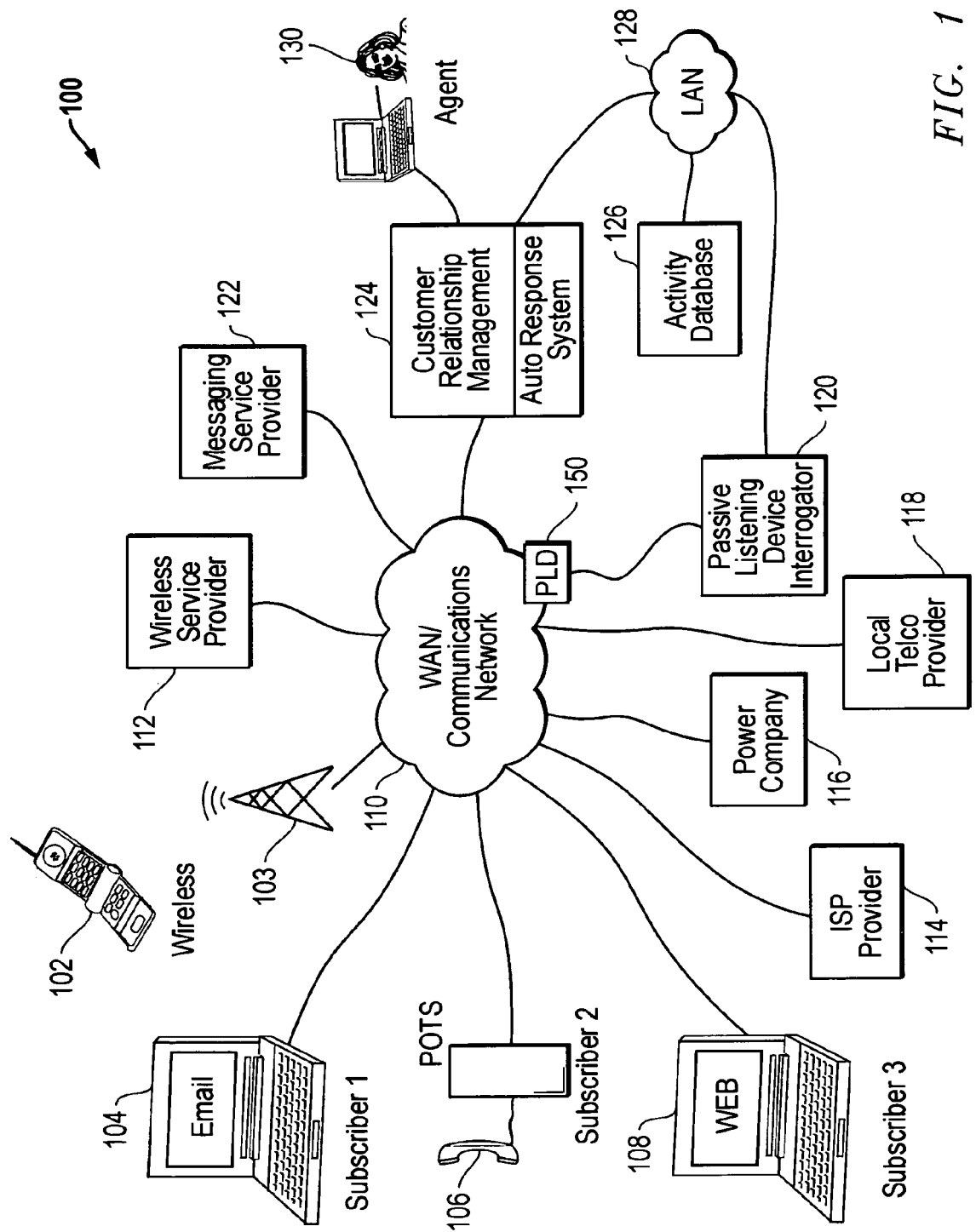
FIG. 1 presents a block diagram of a communication system that incorporates teachings of the present disclosure.

Referring to FIG. 1 an illustrated system 100 for detecting network performance and providing customer specific performance data to a customer via a customer relationship management module 124 is provided. As depicted, system 100 may help support subscribers and include client interaction interfaces such as e-mail interface 104, telephone interface 106, mobile/wireless interface 102, utilizing antennae 103, and/or Internet interface 108.

System 100 may be implemented by and/or in connection with a communications network-like wide area network (WAN) 110 that facilitates the coupling together of a plurality of service providers such as Internet Service Provider (ISP) 114, power company 116, local Telco provider 118, wireless service provider 112, and messaging service provider 122. System 100 may also include a service bureau offering that assists in near real time tracking of network performance for individual subscribers. As depicted, this service bureau may include a local area network (LAN) 128 interconnecting several components such as customer relationship management module 124, passive listening device interrogator 120, activity database 126, and agent 130.

In an illustrated embodiment, passive listening device interrogator 120 may include a specialized server for locating, addressing, and receiving information from various passive listening devices (PLDs) such as stand-alone PLD 150 located within WAN 110. As depicted, WAN 110 could take several forms including the Public Internet. Depending upon how a designer elects to implement system 100, various components of WAN 110 may have PLDs installed within them. For example, each of the depicted service providers and each of the subscriber interface mechanisms could contain at least one PLD. Stand-alone PLDs may also be installed at predefined critical locations. These PLDs may be configured to periodically transmit status information over WAN 110, and/or the PLDs may be responsive to interrogation by PLD interrogator 120.

When a subscriber experiences perceived problems in communicating via WAN 110 and/or some other network, the subscriber may call a customer service department and be placed in contact with customer relationship management module (CRMM) 124. CRMM 124 may be designed to include an auto-response system and a database maintaining customer information such as customer account information. In operation, CRMM 124 may receive a call and based on "call data" received with the call such as CallerID, a CRMM 124 database may be accessed to determine additional information about the subscriber. The additional information can include, for example, subscriber location, the services provided to the subscriber, the communication path servicing the subscriber, and/or a list of PLD monitored components providing service to the subscriber.

Utilizing the customer/subscriber specific information, activity database 126 may be accessed over LAN 128. In some implementations, CRMM 124 may request activity data specific to one or more of the monitored components, which may be components of WAN 110 that supply/support the subject subscriber. Activity database 126 may respond to the request by providing information reflecting the performance of monitored components. The information may be updateable. For example, passive listening device interrogator 120 may send queries to distributed PLDs, receive data from component-based PLDs throughout WAN 110, and write some portion of the received data to activity database 126.

In one instance, PLD interrogator 120 may send periodic queries to PLDs throughout WAN 110. PLD interrogator 120 may also send near-real-time queries to implicated PLDs throughout WAN 110 in response to a particular subscriber inquiry. PLD interrogator 120 can operate on the received data and communicate the network status and/or component status to CRMM 124. Thus, when CRMM 124 requests information specific to a customer/subscriber, activity database 126 may provide historical customer-specific performance data to CRMM 124. In addition, CRMM 124 may also gather additional real-time data. This may not be the only way information is input into activity database 126. For example, outside plant personnel, network status organizations, and/or others may also provide or key-in information to activity database 126.

If CRMM 124 can identify a component in WAN 110 that is under-performing and/or has a significant degradation, the news of this network problem may be sent to the subscriber making the inquiry utilizing an auto-response system. System or component degradation may be hierarchically ordered by CRMM 124 in order of occurrence (date and time), probability of causing a problem, and/or severity. Subject matter in a subscriber query may be linked to an occurrence utilizing a failure analysis, and CRMM 124 may automatically reply to the subscriber request via a communication interface linked to or with WAN 110.

In some cases, the reply to a subscriber may be customer-specific system performance status even when the system is operating within its specified limits. An auto response that provides system performance may be provided to the subscriber based on real-time actual performance, a derived performance characteristic, or a high probability that a component within a communication system has caused unacceptable performance, and/or some other metric or data. In the event that a subscriber inquiry is relatively complicated, the inquiry may be sent from CRMM 124 to agent 130. As such, agent 130 may have access to activity database 126 via LAN 128, and CRMM 124 may automatically provide agent 130 with a list of system performance characteristics that come from distributed PLDs and are subscriber-specific. Although only one agent is illustrated, CRMM 124 may be configured to supply hundreds of agents.

In practice, CRMM 124 may store historic communication responses to subscriber inquiries. As such, in some cases CRMM 124 may determine with a high probability what the problem is for a given subscriber circumstance and provide an inquiring subscriber with a "canned" response. In practice, responses may be assigned confidence levels based on how likely the response is to cover the subscriber inquiry. When the confidence level is low, the inquiry can be routed to agent 130 for manual processing; when the confidence level is high the auto response system can automatically respond.

The system disclosed may utilize many different methods to monitor the communication network 110. A stand-alone PLD 150 or any PLD may use monitoring technologies based on, for example, anomaly detection, heuristics, traffic pattern analysis, application analysis, payload analysis, code violations, as well as passive listening and/or active listening. In some embodiments, an appliance or stand-alone PLD 150 may provide for near-real-time analysis of usage, availability, and performance for applications and services running across public and private networks. For example, stand-alone PLD 150 may measure response times for Internet Protocol applications, network applications, and/or other Web applications. Depending upon implementation detail, stand-alone PLD 150 may be coupled to a port on a data center switch. In some applications, stand-alone PLD 150 may be located behind a corporate firewall, it may track and analyze network activity and usage, and generated information may be stored in a repository or database.

Utilizing stand-alone PLD 150 in combination with activity database 126 may allow agents 130 and technicians to more quickly identify and resolve network problems. In operation, localizing a problem may be accomplished by considering, for example, the interdependencies of a larger network. In effect, such a solution may narrow down the search for customer-specific performance data to a particular component or platform. When a subscriber calls for service, they may be asked questions about their problem. Utilizing an interactive-voice-response system (IVR) the system may be able to learn more about the subscriber's problem and pinpoint a malfunctioning device. Moreover, call-center support personnel may be informed of the problem and made aware of customers who could be impacted by the problem—allowing call center personnel to proactively notify potentially affected customers.

Figure 2:
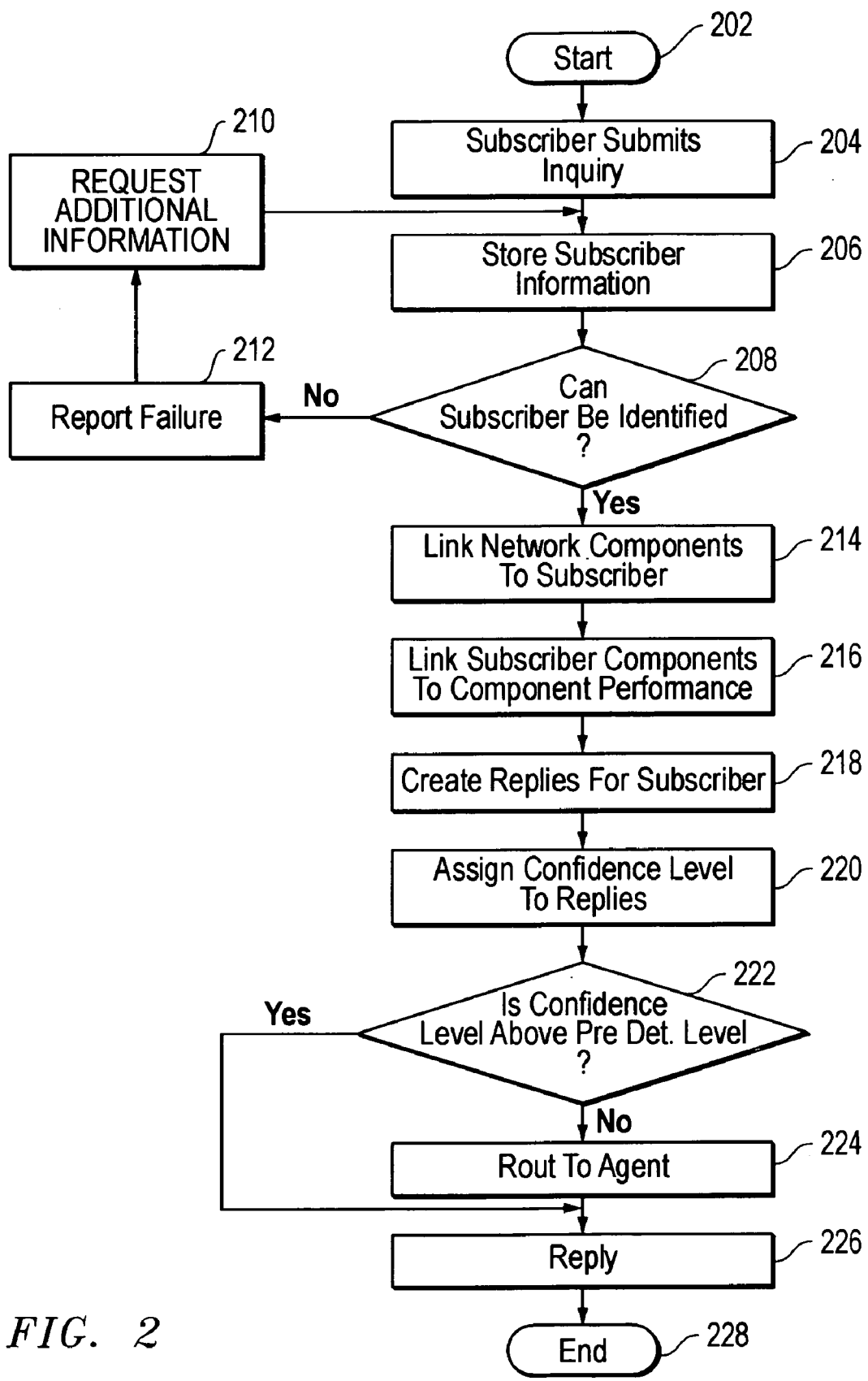
FIG. 2 shows a flow diagram of a method for providing customer service for a communication service provider in accordance with the teachings disclosed herein.

Referring now to FIG. 2 a method of operation that may be used in connection with system 100 of FIG. 1 is illustrated. The method starts at 202 and proceeds to 204 where a subscriber submits an inquiry to a service provider. Data can be gathered regarding the inquiry such as a CallerID telephone number, an e-mail address, and account number, or a MAC address of the subscriber. Additional data may be gathered from prompting the caller and storing caller responses. Additional data can include details about the phenomena surrounding the caller's problem such as slow speed, inoperability, intermittency or whether the problem is reoccurring. This information can be utilized to help diagnose and isolate the cause of the problem.

The subscriber information may be stored at step 206; at decision step 208 it may be determined whether the subscriber can be accurately identified. If the subscriber cannot be accurately identified, then a failure may be recorded at step 212 and additional information may be requested at 210. The method may then proceed back to step 206. If the subscriber can be identified, the monitored components that supply the subscriber with communication services may be identified at step 214. At step 216, the monitored network components that are linked to the subscriber may be queried for past performance and possibly current performance problems. A reply to the subscriber may be created from a library of replies based on component performance at step 218. A confidence level may be assigned to each reply at step 220 based on the likelihood that a reply provides useful information. If the confidence level for a given reply is above a predetermined value, the method may proceed to reply at step 226 where the reply is sent. If the confidence level of the reply is less than a predetermined level, the inquiry may be routed to an agent at step 224 and the process ends at step 228.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for providing automated customer support comprising:
a customer relations management module configured to:
receive a signal from each of a plurality of passive listening devices coupled to a data center switch, each of the passive listening devices configured to monitor a performance characteristic of at least a portion of a communication network and to output the signal in response to the monitored performance characteristic, each of the passive listening devices responsive to interrogation by an interrogation device and configured to receive queries from the interrogation device in response to a subscriber inquiry;
identify at least one monitored component of the communication network that provides service to a particular subscriber making the subscriber inquiry;
receive historical subscriber-specific performance data related to the particular subscriber and associated with the at least one monitored component from a performance database accessible to the customer relations management module and to each of the passive listening devices;
generate a list of responses to the subscriber inquiry based on an analysis of data located in the performance database;
assign a confidence level to each particular response in the list of responses based on a likelihood of the particular response addressing the subscriber inquiry;
automatically transmit at least one of the responses to the particular subscriber when the confidence level assigned to the at least one response satisfies a threshold level; and
automatically route the subscriber inquiry to an agent station when the confidence level assigned to each of the responses fails to satisfy the threshold level.

2. The system of claim 1, wherein the at least one monitored component has at least one operating parameter and the at least one operating parameter can deviate from an average perfoinance to a minimal performance, wherein the customer relations management module is further configured to retrieve minimal performance data.

3. The system of claim 2, wherein the customer relations management module is further configured to retrieve the minimal performance data from a plurality of network components.

4. The system of claim 1, wherein at least one of the plurality of passive listening devices is coupled to one of a subscriber computer, a subscriber modem, a service platform, a power monitor, a network traffic monitor, a status-reporting organization, a server monitor, a memory monitor, a router, a switch, a hub, a voice over interne protocol system, a messaging system, a wireless communication cell, a maintenance records department, a code violation monitor, and a quality-of-service monitor.

5. The system of claim 1, wherein data in the performance database is linked to the particular subscriber by one of a geographic location, subscriber connection data, and a list of services provided to the particular subscriber.

6. The system of claim 1, wherein each of the plurality of passive listening devices is coupled to the customer relations management module and wherein the plurality of passive listening devices are distributed throughout multiple communication networks.

7. The system of claim 1, wherein at least one of the plurality of passive listening devices is located behind a firewall.

8. The system of claim 1, wherein at least one of the plurality of passive listening devices is within a network appliance.

9. The system of claim 1, wherein each of the plurality of passive listening devices is configured to monitor the performance characteristic based on at least one of anomaly detection, heuristics, traffic pattern analysis, application analysis, payload analysis, and code violations.

10. The system of claim 1, wherein the interrogation device includes a server configured to locate, address, and receive data from at least one of the plurality of passive listening devices, the interrogation device configured to write a portion of the received data to the performance database.

11. The system of claim 1, wherein at least one of the plurality of passive listening devices is a stand alone device that is not disposed within another network component.

12. A method of providing customer service comprising:
receiving a signal from each of a plurality of passive listening devices coupled to a data center switch, each of the passive listening devices configured to monitor a performance characteristic of at least a portion of a communication network and to output the signal in response to the monitored performance characteristic, each of the passive listening devices responsive to interrogation by an interrogation device and configured to receive queries from the interrogation device in response to a subscriber inquiry;
identifying at least one monitored component of the communication network that provides service to a particular subscriber making the subscriber inquiry;
receiving historical subscriber-specific performance data related to the particular subscriber and associated with the at least one monitored component from a performance database accessible to the data center switch and to the plurality of passive listening devices;
generating a list of responses to the subscriber inquiry based on an analysis of data located in the performance database;
assigning a confidence level to each particular response in the list of responses based on a likelihood of the particular response addressing the subscriber inquiry;
automatically transmitting at least one of the responses to the particular subscriber when the confidence level assigned to the at least one response satisfies a threshold level; and
automatically routing the subscriber inquiry to an agent station when the confidence level assigned to each of the responses fails to satisfy the threshold level.

13. The method of claim 12, further comprising communicating the at least one response in real time.

14. The method of claim 12, further comprising:
classifying the subscriber inquiry as a subscriber network performance issue; and
identifying a network component that could cause the subscriber network performance issue.

15. The method of claim 12, wherein stored information indicates that more than one network components provide unacceptable performance.

16. The method of claim 15, further comprising initiating display of a list identifying the more than one network components.

17. The method of claim 12, wherein each of the plurality of passive listening devices is configured to monitor at least one of a subscriber computer, a subscriber modem, a service platform, a power monitor, a network traffic monitor, a status reporting organization, a server monitor, a memory monitor, a router, a switch, a hub, a voice over internet protocol system, a messaging system, a wireless communication cell, a maintenance records department, service records, call records, weather data, a code violation monitor and a quality-of-service monitor.

18. The method of claim 12, further comprising linking the particular subscriber to a network status by one of geographic location, connection data, and subscriber services utilized.

19. The method of claim 12, further comprising receiving an identifier associated with the subscriber inquiry, wherein the identifier comprises caller identification information.

20. The method of claim 12, further comprising receiving the subscriber inquiry via an interactive voice response system.

21. The method of claim 12, further comprising receiving the subscriber inquiry via a website.

22. The method of claim 12, further comprising receiving the subscriber inquiry via a telephony service call.

23. The method of claim 12, further comprising receiving the subscriber inquiry via a voice over internet protocol call.

24. The method of claim 12, wherein each of the plurality of passive listening devices is configured to monitor the performance characteristic based on at least one of anomaly detection, heuristics, traffic pattern analysis, application analysis, payload analysis, and code violations.

25. The method of claim 12, wherein the interrogation device includes a server configured to locate, address, and receive data from at least one of the plurality of passive listening devices, the interrogation device configured to write a portion of the received data to the performance database.

* * * * *